United States Patent [19]

Wade

[11] 4,192,558
[45] Mar. 11, 1980

[54] SELF-LUBRICATING BEARING

[75] Inventor: Elman E. Wade, Ruffsdale, Pa.

[73] Assignee: Westinghouse Electric Corp., Pittsburgh, Pa.

[21] Appl. No.: 837,068

[22] Filed: Sep. 28, 1977

Related U.S. Application Data

[62] Division of Ser. No. 748,352, Dec. 7, 1976, Pat. No. 4,113,558.

[51] Int. Cl.² ............... F16C 17/00; F16C 1/24; G21C 19/20
[52] U.S. Cl. ............... 308/6 R; 308/187; 176/30; 176/87
[58] Field of Search ............... 308/6 R, 16, 93, 101, 308/107, 187, 187.1; 176/30, 31, 32, 87

[56] References Cited

U.S. PATENT DOCUMENTS

| 2,037,843 | 4/1936 | Wood | 308/187.1 |
|---|---|---|---|
| 2,044,380 | 6/1936 | Cobb | 308/187.1 |
| 2,221,553 | 11/1940 | Okun | 308/187.1 |
| 2,827,344 | 3/1958 | Maag | 308/187.1 |
| 2,976,089 | 3/1961 | Vogt | 308/187 |
| 3,015,527 | 1/1962 | Schmidt | 308/187 |
| 3,504,952 | 4/1970 | Farmer | 308/6 R |
| 4,010,987 | 3/1977 | Jasperse | 308/187.1 |

Primary Examiner—Samuel W. Engle
Assistant Examiner—Donald P. Walsh
Attorney, Agent, or Firm—L. A. De Paul; Z. L. Dermer

[57] ABSTRACT

A bearing with a lubricant reservoir that is capable of being refilled when the bearing and reservoir are submerged in a lubricant pool. The lubricant reservoir supplies lubricant to the bearing while the bearing allows a small amount of lubricant to leak passed appropriately placed seals creating a positive out flow of lubricant thereby preventing foreign material from entering the bearing.

4 Claims, 8 Drawing Figures

SELF-LUBRICATING BEARING

This is a division, of application Ser. No. 748,352 filed Dec. 7, 1976, now U.S. Pat. No. 4,113,558 issued Sept. 12, 1978.

BACKGROUND OF THE INVENTION

This invention relates to self-lubricating bearings and particularly to self-lubricating bearings of nuclear fuel handling equipment.

In nucelar reactor systems well known in the art, the reactor vessel has a closure head sealed to the top thereof and fuel assemblies disposed therein in an array generally referred to as a core. The fuel assemblies consist of cylindrical fuel elements containing nuclear fuel which when appropriately arranged in the core produce heat in a manner well understood by those skilled in the art. The reactor vessel also has an inlet and an oulet for circulating a coolant in heat transfer relationship with the fuel assemblies thereby cooling the fuel assemblies. The coolant having absorbed heat from the fuel assemblies may then be conducted to a remote location to produce steam in a commonly understood fashion. After a period of reactor operation, the nuclear fuel in the fuel elements of the fuel assemblies becomes depleted or spent. Therefore, after a period of reactor operation, the spent fuel assemblies must be removed from the core and replaced with fresh ones in a process referred to as reactor refueling.

In many designs of reactor refueling equipment a grapple attached to a carriage located in a guide tube may be used to remove a chosen spent fuel assembly from the core or to place a fresh fuel assembly in the core. In these designs, the carriage may have wheels that slide on tracks in the guide tube which assures proper alignment of the grapple, carriage, and fuel assembly while the fuel assembly is transported. When lifting or lowering such a fuel assembly, the carriage may be required to be submerged in the reactor coolant pool while at other times the carriage may be at an elevation above the top of the reactor coolant pool. Since a cover gas may fill the void between the top of the reactor coolant pool and the bottom of the closure head, the carriage and its wheels become exposed to cyclical submergence and emergence from a coolant to a gas atmosphere. This cyclical exposure can have adverse effects on the bearings used in the wheels of the carriage that may severely limit the useful life of such a grapple and carriage. Such adverse effects are particularly prevalent in fast breeder reactors that utilize liquid sodium as the reactor coolant because the liquid sodium develops dross, which may be due to oxidation of the liquid metal or other impurities therein, on the top of the coolant pool at the liquid-gas interface as is well understood in the art. The dross may then seep into the small clearance in the bearings where it may cause the bearing to jam and, therefore, malfunction. Of course, this problem may be minimized by minimizing the number of times the bearing must pass through the layer of dross on the surface of the coolant; however, this is not a satisfactory solution where, due to other design criteria, minimizing such cyclical motion is not possible.

In U.S. Pat. No. 2,976,089 to R. B. Vogt, issued Mar. 21, 1961 there is described a roller wheel bearing that contains a fitting for forcing grease through the bearing so that the grease will exude through clearances in the bearing to thereby prevent entry of foreign particles. However, the Vogt patent does not solve the problems of preventing entry of such foreign matter where access to such bearing is limited because of the radioactive nature of the environment or where grease may not be used because of its contaminating nature. Furthermore, the Vogt patent does not describe a bearing that is capable of automatically replenishing the lubricant supply during normal operation. For these and other reasons, the roller wheel bearing described in the Vogt patent would not be suitable for reactor refueling operations or other operations wherein the bearing would be exposed to the dross formation.

A bearing device having an oil reservoir for supplying oil to bearings in rotary machines is disclosed in U.S. Pat. No. 3,804,476 to Nakamura et al, issued Apr. 16, 1974. While the reservoir described therein does provide an oil lubricant for the bearing, it is not capable of automatic refilling during the normal operation of the bearing. Moreover, the Nakamura patent describes a bearing which has the purpose to limit the flow of oil from the bearing and from the reservoir without addressing the problem of preventing foreign material from entering the bearing.

SUMMARY OF THE INVENTION

A bearing with a lubricant reservoir that is capable of being refilled when the bearing and reservoir are submerged in a lubricant pool. Lubricant from the reservoir flows into the bearing thereby lubricating the moving parts of the bearing. A small amount of lubricant is allowed to leak passed appropriately placed seals in the bearing thus creating a slight flow of lubricant from the reservoir through the bearing. The flow of lubricant being outward from the bearing prevents foreign material from entering the bearing thereby improving the bearing's performance and useful life. The bearing is capable of being used in a grapple carriage of a nuclear fuel handling machine wherein the carriage is submerged in the reactor coolant pool during normal operation of the nuclear fuel handling machine thereby filling the lubricant reservoir with the reactor coolant which is then used as the lubricant for the bearing.

It is an object of this invention to provide a bearing having a lubricant reservoir capable of being refilled when the bearing and reservoir are submerged in a lubricant pool.

It is another object of this invention to provide a bearing that allows a small amount of lubricant to leak passed appropriately placed seals for preventing foreign material from entering the bearing.

It is a particular object of this invention to provide a bearing having a lubricant reservoir capable of being refilled when the bearing and reservoir are submerged in a lubricant pool that allows a small amount of lubricant to leak passed appropriately placed seals for preventing foreign material from entering the bearing.

It is a more particular object of this invention to provide a nuclear fuel handling grapple carriage having a bearing with a lubricant reservoir capable of being refilled when the bearing and reservoir are submerged in the reactor coolant pool that allows a small amount of lubricant to leak passed appropriately placed seals for preventing foreign material from entering the bearing.

BRIEF DESCRIPTION OF THE DRAWINGS

While the specification concludes with claims specifically pointing out and distinctly claiming the subject matter of the invention, it is believed the invention will be better understood from the following description taken in conjunction with the accompanying drawings, wherein:

DESCRIPTION OF THE PREFERRED EMBODIMENT

During the refueling of some liquid metal fast breeder reactors, it is necessary that a grapple carriage with a grapple attached to it, be moved in and out of the liquid sodium coolant pool in order to lift and lower fuel assemblies within the reactor vessel. Since a film of impurities may form on the surface of the liquid sodium pool and since the grapple carriage contacts this film when entering or exiting the liquid sodium pool, it is necessary to prevent the impurities from seeping through small clearances in the bearings of the grapple carriage because such impurities may have a deleterious effect on such bearings. The invention described herein provides a means for excluding such impurities while lubricating the bearing.

Figure 1:
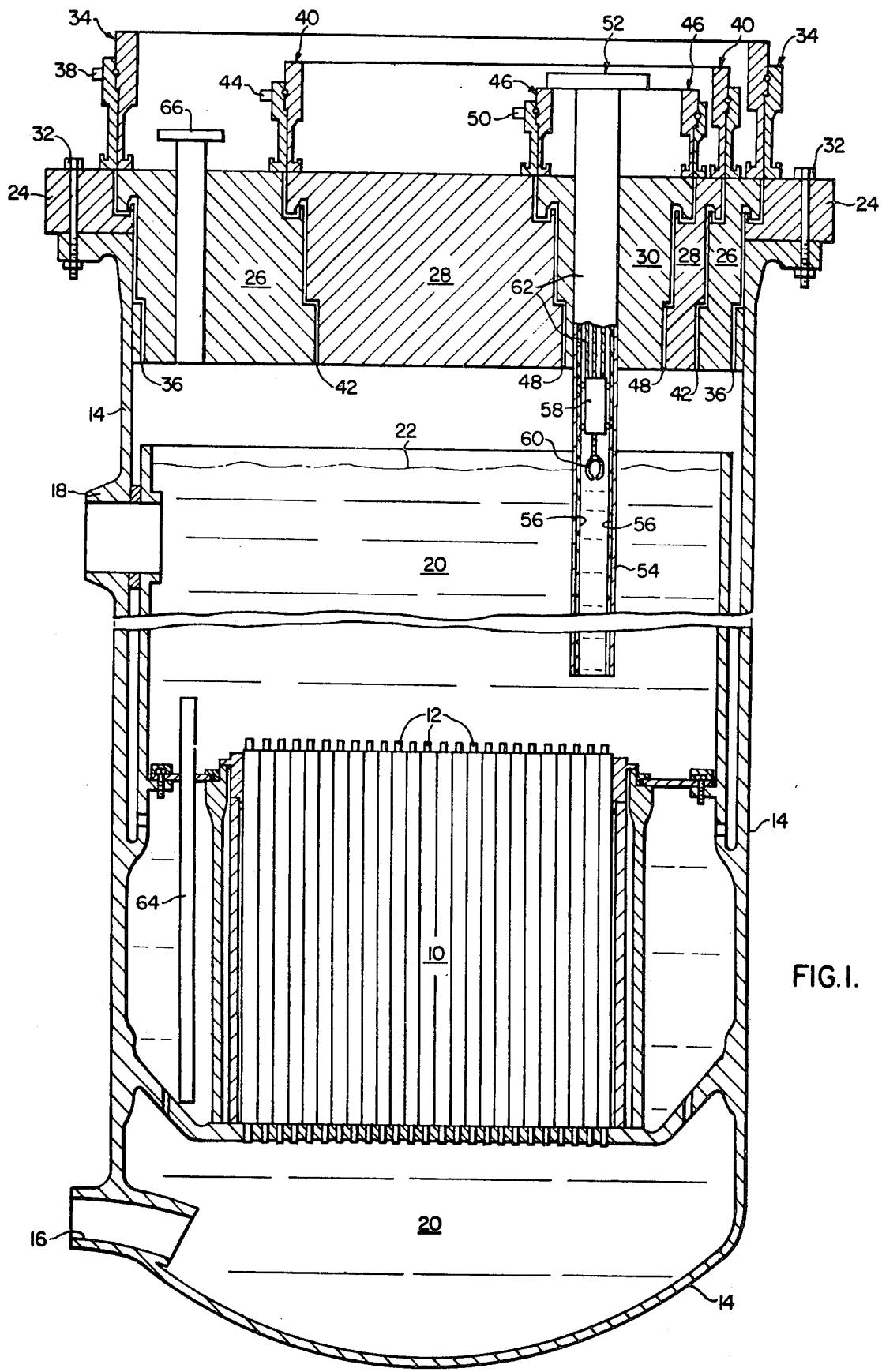
FIG. 1 is a cross sectional view in elevation of a nuclear reactor.

Referring to FIG. 1, a core 10 comprising fuel assemblies 12 that product heat is contained within a reactor vessel 14. The reactor vessel 14 has an inlet 16, and an outlet 18 that permits a coolant 20 to circulate in a heat transfer relationship with the fuel assemblies 12. The coolant 20, which in a fast breeder reactor may be liquid sodium, fills the reactor vessel 14 to a coolant level 22. The reactor vessel 14 is closed at its top end by a closure head comprising a stationary outer ring 24, a large rotatable plug 26, an intermediate rotatable plug 28, and a small rotatable plug 30. The stationary outer ring 24 may be attached to reactor vessel 14 by bolts 32 or other suitable means known in the art. The large rotatable plug 26 is supported from the stationary outer ring 24 by large riser assembly 34. The outer edge of large rotatable plug 26 together with the inner edge of stationary outer ring 24 define an annulus 36 therebetween. The large riser assembly 34 which contains bearings and seals (not shown) is driven by a large plug drive mechanism 38 that enables the large rotatable plug 26 to move relative to stationary outer ring 24 while maintaining a fluid tight boundary between the outside and inside of reactor vessel 14. In addition, the large riser assembly 34 locates the bearings, seals, and drive mechanism away from the hot surface of the large rotatable plug 26 thus providing a cooler operating environment and thus allowing a greater range of selectivity of bearing, seal, and drive mechanism materials.

Again referring to FIG. 1, intermediate rotatable plug 28 is disposed eccentrically within large rotatable plug 26, supported by intermediate riser assembly 40 defining an annulus 42 therebetween, and is driven by intermediate plug drive mechanism 44 in a manner similar to that of the large riser assembly 34. Likewise, the small rotatable plug 30 is similarly eccentrically disposed within intermediate rotatable plug 28, supported by small riser assembly 46 defining an annulus 48 therebetween, and driven by small plug drive mechanism 50.

Still referring to FIG. 1, an in-vessel transfer machine 52 is disposed in small rotatable plug 30. Invessel transfer machine 52 comprises a fuel transfer tube 54, tracks 56, grapple carriage 58, grapple 60, and grapple control mechanism 62. Fuel transfer tube 54 may be a cylindrical tube with tracks 56 attached to the inside thereof which together serve to guide grapple carriage 58 on its ascent or descent through fuel transfer tube 54. Grapple 60 may be chosen from those grapples well known in the art. Grapple 60 is used to engage the top of a chosen fuel assembly 12 so that the fuel assembly 12 may be lifted or lowered from the core 10. Grapple control mechanism 62 which may be chosen from those control mechanisms well known in the art may be located in the top of in-vessel transfer machine 52 and be connected to grapple carriage 58 and grapple 60 so as to be able to lift or lower grapple carriage 58 and to control the engaging of grapple 60. During the refueling process when it is necessary to remove a chosen fuel assembly 12 from core 10, the large rotatable plug 26, intermediate rotatable plug 28, and small rotatable plug 30 are selectively rotated in a combination so that fuel transfer tube 54 is directly above and in colinear alignment with the chosen fuel assembly 12 in core 10. Grapple control mechanism 62 is then activated thereby allowing grapple carriage 58 to slide down tracks 56 in fuel transfer tube 54 into the reactor coolant 20 until grapple 60 contacts the top of the chosen fuel assembly 12. Grapple control mechanism 62 then causes grapple 60 to engage the top of the chosen fuel assembly 12. Once the chosen fuel assembly 12 has been engaged by grapple 60, grapple control mechanism 62 then causes grapple carriage 58 to be lifted up out of the reactor coolant 20 thereby lifting the chosen fuel assembly 12 completely within fuel transfer tube 54. Once the chosen fuel assembly 12 has been lifted completely into fuel transfer tube 54, the rotatable plug are again selectively rotated such that fuel transfer tube 54 is directly above and in colinear alignment with fuel storage tube 64 which is a vessel with an open top end and disposed at various locations around core 10 for temporarily holding fuel assemblies. When fuel transfer tube 54 is in alignment with fuel storage tube 64, grapple control mechanism 62 again lowers grapple carriage 58 into the pool of reactor coolant 20 thereby lowering the chosen fuel assembly 12 into fuel storage tube 64 and also causes grapple 60 to disengage the top of the chosen fuel assembly 12. Grapple carriage 58 is then lifted back out of the pool of reactor coolant 20 and the rotatable plugs rotate fuel transfer tube 54 away from fuel storage tube 64. At this point, the large rotatable plug 26 is rotated so that ex-vessel transfer port 66 becomes aligned with fuel storage tube 64. When in this configuration, an ex-vessel transfer machine (not shown) which may be chosen from those well known in the art and may be similar to in-vessel transfer machine 52 is then attached to ex-vessel transfer port 66 in such a manner that the fuel assembly 12 in fuel storage tube 64 may be lifted through ex-vessel transfer port 66 and thereby removed from reactor vessel 14 where it may be removed to a location remote from the reactor vessel 14. Of course, this process may be reversed so that a fresh fuel assembly may be introduced into reactor vessel 14 and core 10.

As previously described, during the refueling process grapple carriage 58 may be repeatedly submerged in the pool of liquid sodium coolant 20. Because the liquid sodium develops a layer of impurities, called dross, on the top surface of the coolant pool at coolant level 22 which may be due to oxidation of the liquid sodium or other impurities in the liquid sodium that have risen to the top surface, each time grapple carriage 58 passes in or out of the coolant pool some dross adheres to grapple carriage 58. The dross may cling to grapple carriage 58 and interfere with its movement on tracks 56 or the dross may seep through clearances between parts of grapple carriage 58 where the dross may hinder relative motion of those parts and cause damage to those parts or otherwise reduce the useful life of grapple carriage 58.

Figure 2:
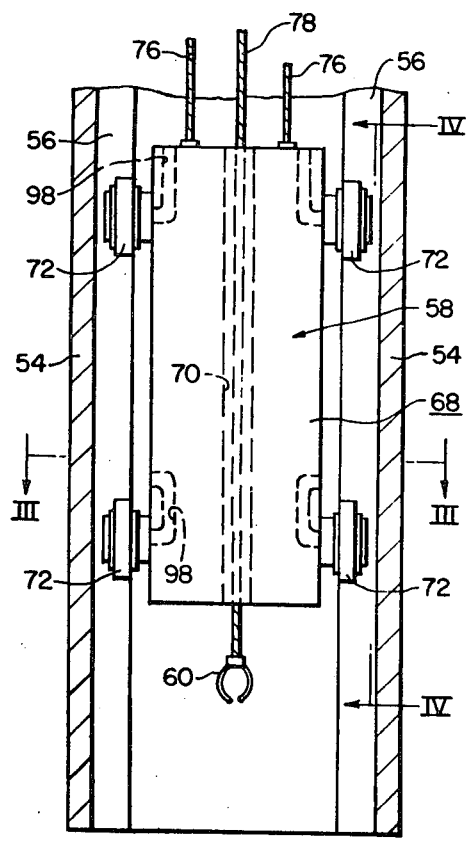
FIG. 2 is a partial cross sectional view in elevation of the grapple carriage and fuel transfer tube.
Figure 4:
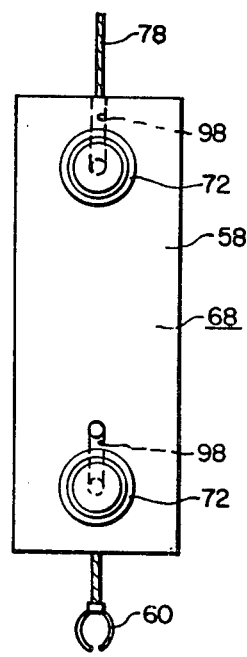
FIG. 4 is a side view in elevation of the grapple carriage.
Figure 3:
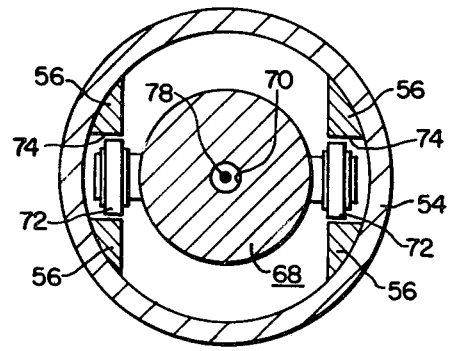
FIG. 3 is a cross sectional view taken along line III—III of FIG. 2.

Referring now to FIGS. 2, 3, and 4 grapple carriage 58 consists of a body 68 which may be a metal member manufactured from 304 stainless steel and having a center bore 70 therethrough. Two rollers 72 are attached to one end of body 68 while another set of two rollers 72 are attached at the other end. Grapple carriage 58 is disposed between tracks 56, as shown in FIG. 3, such that tracks 56 may guide rollers 72 as grapple carriage 58 is moved through fuel transfer tube 54. Tracks 56 are separated such that a gap 74 exists between one pair of tracks 56 and rollers 72 so that rollers 72 may pass therethrough with little hinderance. Furthermore, gap 74 assures free movement of rollers 72 even though a layer of dross develops on tracks 56. In this particular case, grapple control mechanism 62 may consist of two hoist chains 76 and a grapple actuating chain 78. The two hoist chains 76 are attached at one end to the top of grapple carriage 58 and at the other end to a lifting mechanism (not shown) which may be a chain-sprocket hoist chosen from those well known in the art. Grapple actuating chain 78 may be attached at one end to a control mechanism (not shown) chosen from those well known in the art and may extend through center bore 70 where its other end is attached to grapple 60. In this arrangement, grapple carriage 58 may be lifted or lowered through fuel transfer tube 54.

Figure 6:
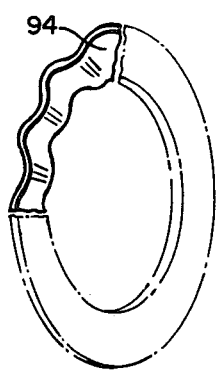
FIG. 6 is a side view in perspective of the loading springs.
Figure 5:
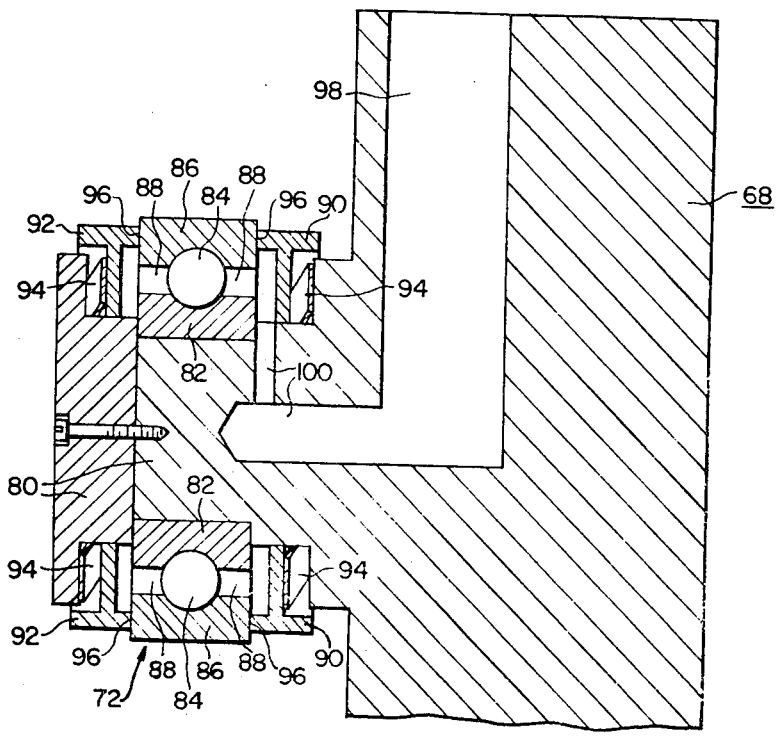
FIG. 5 is a cross sectional view in elevation of the bearing and reservoir.

Referring now to FIG. 5, rollers 72 incorporate a bearing that is capable of preventing dross from seeping into the bearing thereby increasing the life of the bearing. An axle 80 which may be either of cylindrical extension of body 68 or a cylindrical member fitted into body 68, extends from body 68 at four locations corresponding to the location of rollers 72 which are mounted thereon. An inner race 82 which may be a ring shaped piece of metal extending around axle 80 is mounted in axle 80 in a conventional manner. Conventional ball bearings 84 rest partially in inner race 82 and are held in place by outer race 86 which is a ring shaped piece of metal similar to inner race 82. Ball bearings 84 establish a gap 88 between inner race 82 and outer race 86 which enables outer race 86 to rotate around axle 80 relative to inner race 82 and axle 80 in a manner well known in the bearing art. An inner seal ring 90 which is a Tshaped Stellite ring is disposed on the inner end of axle 80 and an outer seal ring 92 is disposed on the outer end of axle 80, together they provide a controlled leakage path. Loading springs 94 which may be a ring type leaf spring as shown in FIG. 6, are provided between seal rings and a recessed portion of axle 80 as shown in FIG. 5. Loading springs 94 force the seal rings 90 and 92 against outer race 86 thereby assuring that the annular space 96 between the seal rings and outer race 86 is approximately 0.001 inch to about 0.003 inches which establishes the proper controlled leakage path. The surfaces of outer race 86 and seal rings 90 and 92 that contact each other along annular space 96 may be hard surfaced finished with chrome plating. Likewise, the outer surface of outer race 86 that contacts tracks 56 may be hard surfaced finished with a Stellite finish. In this configuration outer race 86 functions as and is identical to roller 72 as shown in FIGS. 2 and 5.

Again referring to FIG. 5, a reservoir 98 is provided in body 68 in a vertical relationship with body 68 and is provided with its top end near the top of body 68 such that when body 68 of grapple carriage 58 is submerged in the pool of reactor coolant 20 reservoir 98 fills with liquid sodium coolant 20. A passage 100 is provided near the bottom of reservoir 98 that connects reservoir 98 with gap 88 thereby allowing the liquid sodium to flow from reservoir 98 to gap 88 thus lubricating ball bearings 84. A small amount of liquid sodium also is allowed to leak through annular space 96 establishing a positive out flow of liquid sodium and thus preventing dross from seeping in to ball bearings 84.

OPERATION

During refueling of the nuclear reactor, grapple carriage 58 is submerged in the pool of liquid sodium coolant 20. Since a layer of impurities, called dross, forms on the top of the liquid sodium at coolant level 22 when grapple carriage 58 is lifted from the coolant pool a film of dross may adhere to parts of rollers 72 such as outer race 86 and seal rings 90 and 92. This dross has a tendency to seep through annular space 96 and into gap 88 where it can damage ball bearings 84 thereby necessitating replacement or repair of grapple carriage 58. However, in the invention described herein, when grapple carriage 58 is submerged in the coolant pool, reservoir 98 becomes filled with liquid sodium. When grapple carriage 58 is withdrawn from the coolant pool, the liquid sodium flows through passage 100 and into gap 88 thereby lubricating ball bearings 84. Furthermore, the liquid sodium slowly seeps through annular space 96 establishing a positive out flow of liquid sodium which prevents dross from seeping inward. Moreover, any impurities that may enter reservoir 98 become diluted each time reservoir 98 is submerged in the coolant pool. Reservoir 98 is constructed having a volume such that a sufficient amount of liquid sodium may be contained therein to last until grapple carriage 58 is resubmerged in the coolant pool. Should grapple carriage 58 not be used for a length of time that may empty reservoir 98, grapple carriage 58 may be stored in a submerged position in the liquid sodium pool thus maintaining the bearing in the liquid sodium lubricant. In addition, a remotely removable shim may be placed in annular space 96 to temporarily increase the width of annular space 96 so that when grapple carriage 58 is lowered into the coolant pool for the first time gases may escape therethrough and allow reservoir 98 to fill more easily. The shims may then be remotely removed thus allowing the width of annular space 96 to return to its normal setting. The invention, therefore, provides a nuclear fuel handling grapple carriage having a bearing with a lubricant reservoir capable of being refilled when the bearing and reservoir are submerged in the reactor coolant pool that allows for lubrication of the bearing and allows a small amount of lubricant to leak passed appropriately placed seals for preventing foreign material from entering the bearing.

Figure 7:
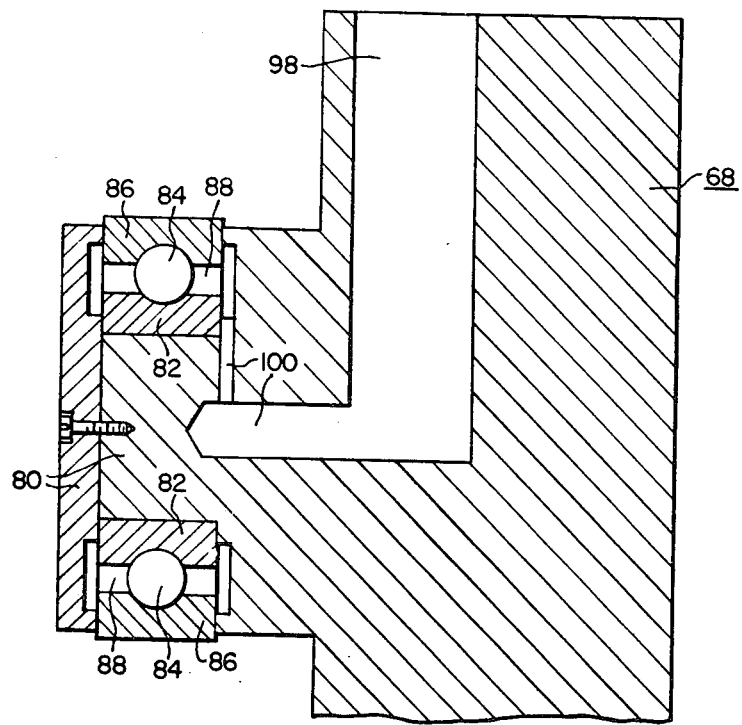
FIG. 7 is a cross sectional view in elevation of an alternate bearing.
Figure 8:
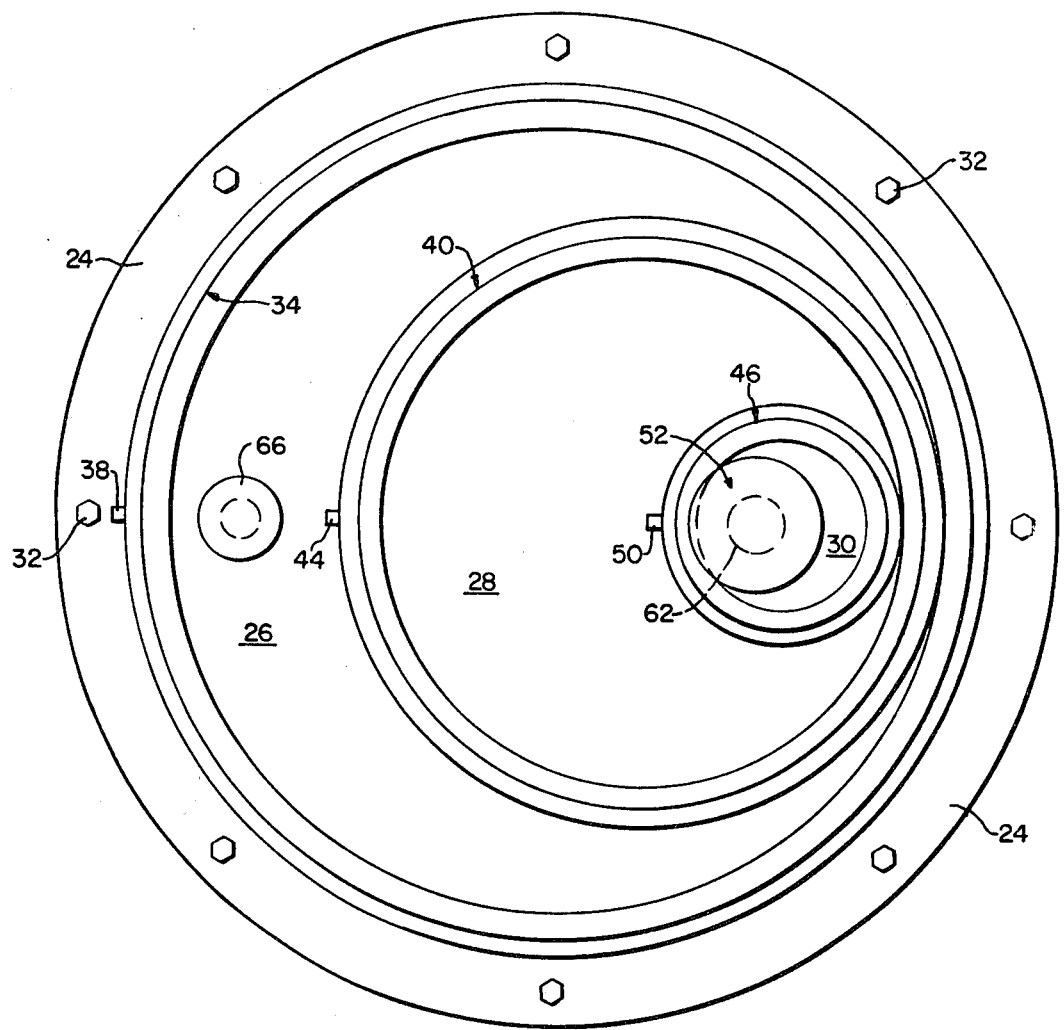
FIG. 8 is a plan view of the reactor shown in FIG. 1.

While there is described what is now considered to be the preferred embodiment of the invention, it is, of course, understood that various other modifications and variations will occur to those skilled in the art. The claims, therefore, are intended to include all such modifications and variations which fall within the true spirit and scope of the present invention. For example, seal rings 90 and 92 along with loading springs 94 may be eliminated when axle 80 is manufactured as shown in FIG. 7. Furthermore, the reservoir 98 may be eliminated on rollers 72 that constantly remain in the liquid sodium pool.

What I claim is:

1. A bearing comprising:
   an inner race mounted on an axle;
   rolling element bearings disposed in said inner race;
   an outer race disposed around said inner race and enclosing said roller element bearings between said inner and outer races, said roller element bearings allowing said outer race to rotate relative to said inner race;
   alignment means disposed on said axle and adjacent said outer race for maintaining alignment of said outer race with respect to said inner race while allowing rotation of said outer race;
   a reservoir disposed in said axle capable of being filled with lubricant when said axle is submerged in a lubricant pool; and
   supply means establishing fluid communication between said reservoir and said roller element bearings for supplying said lubricant to said roller element bearings, said lubricant flowing between said outer race and said alignment means establishing an outward flow of said lubricant thereby preventing impurities from seeping inward.

2. The bearing according to claim 1 wherein said alignment means comprises:
   a first seal ring disposed around said axle and adjacent a first end of said outer race defining a first annular space between said first seal ring and said outer race;
   a second seal ring disposed around said axle and adjacent a second end of said outer race defining a second annular space between said second seal ring and said outer race, said first and second seal rings maintaining alignment of said outer race while allowing rotation of said outer race;
   a first loading spring disposed around said axle and adjacent said first seal ring for maintaining said first seal ring in close proximity with said outer race; and
   a second loading spring disposed around said axle and adjacent said second seal ring for maintaining said second seal ring in close proximity with said outer race.

3. The bearing according to claim 2 wherein said first and second annular spaces have widths of about 0.001 inch to about 0.003 inch.

4. The bearing according to claim 3 wherein said supply means comprises a passage in said axle near the bottom of said reservoir connecting said reservoir with said roller element bearings for conducting said lubricant from said reservoir to said roller element bearings and through said first and second annular spaces.

* * * * *